(12) United States Patent
Magnusson

(10) Patent No.: US 6,809,897 B2
(45) Date of Patent: Oct. 26, 2004

(54) DIRECT THREADING HELICAL TAPE PATH FOR SINGLE-REEL TAPE CARTRIDGE

(75) Inventor: Steven L. Magnusson, Boulder, CO (US)

(73) Assignee: Exabyte Corporation, Boulder, CO (US)

( * ) Notice: Subject to any disclaimer, the term of this patent is extended or adjusted under 35 U.S.C. 154(b) by 173 days.

(21) Appl. No.: 10/036,494

(22) Filed: Jan. 7, 2002

(65) Prior Publication Data

US 2003/0128459 A1 Jul. 10, 2003

(51) Int. Cl.$^7$ ............................................. G11B 15/67
(52) U.S. Cl. ............................................. 360/85
(58) Field of Search .................................. 360/85, 95

(56) References Cited

U.S. PATENT DOCUMENTS

| | | | |
|---|---|---|---|
| 3,898,695 A | * | 8/1975 | Yabu et al. .................. 360/85 |
| 4,835,628 A | | 5/1989 | Hinz et al. |
| 4,843,495 A | | 6/1989 | Georgis et al. |
| 5,065,261 A | | 11/1991 | Hughes et al. |
| 5,068,757 A | | 11/1991 | Hughes et al. |
| 5,128,815 A | | 7/1992 | Leonhardt et al. |
| 5,142,422 A | | 8/1992 | Zook et al. |
| 5,202,809 A | | 4/1993 | Dodt et al. |
| 5,374,003 A | | 12/1994 | Hoge et al. |
| 5,602,694 A | | 2/1997 | Miles et al. |

* cited by examiner

Primary Examiner—Robert S. Tupper
(74) Attorney, Agent, or Firm—Nixon & Vanderhye, P.C.

(57) ABSTRACT

A helical scan tape drive (20) has a cartridge compartment (24) for accommodating a single reel cartridge (26) of magnetic tape (56), and a take-up reel (50) which, with respect to a threading path (42), is not coplanar with the cartridge compartment. A threading system (40) grasps an end of the magnetic tape in the cartridge and transports the magnetic tape through the threading path. The threading path is configured such that the magnetic tape is at least partially wrapped around a rotatable scanner (30) before the end of the magnetic tape is attached to the take-up reel. The rotatable scanner has one or more elements (180, 182) for transducing information relative to the magnetic tape. The take-up reel is situated at a location either above or below the cartridge compartment for reducing footprint of the drive. In one embodiment, the take-up reel and the compartment are in an at least partially overlapping relationship.

18 Claims, 8 Drawing Sheets

DIRECT THREADING HELICAL TAPE PATH FOR SINGLE-REEL TAPE CARTRIDGE

BACKGROUND

1. Field of the Invention

The present invention pertains to helical scan recording, and particularly to helical scan tape drives which accommodate a single-reel tape cartridge.

2. Related Art and Other Considerations

In magnetic recording on tape using a magnetic tape drive, relative motion between a head unit (typically with both a write element and a read element) and the tape causes a plurality of tracks of information to be transduced with respect to the tape. The magnetic tape is typically housed in a cartridge which is loaded into the tape drive. The tape extends between a supply reel and a take-up reel.

In a helical scan recording and reproduction arrangement, as the magnetic tape is transported the magnetic tape is at least partially wrapped around a rotating drum (sometimes referred to as a "scanner" or "rotor") so that heads (both write heads and read heads) positioned on the drum are contiguous to the drum as the drum is rotated. In a recording operation, one or more write heads on the drum physically record data on the tape in a series of discrete stripes oriented at an angle with respect to the direction of tape travel. The data is formatted, prior to recording on the tape, to provide sufficient referencing information to enable later recovery during readout by one or more read heads. Examples of helical scan tape drives are shown, inter alia, in the following US patents (all of which are incorporated herein by reference): U.S. Pat. No. 4,835,628 to Hinz et al.; U.S. Pat. No. 4,843,495 to Georgis et al.; U.S. Pat. No. 5,065,261 to Hughes et al.; U.S. Pat. No. 5,068,757 to Hughes et al.; U.S. Pat. No. 5,142,422 to Zook et al.; and U.S. Pat. No. 5,602,694 to Miles et al. (which discloses a capstanless helical scan tape drive).

Historically, helical scan tape drives utilize tape cartridges or cassettes that incorporate two coplanar enclosed reels. These dual reel tape cartridges internally house both a supply reel and a take-up reel. After the cartridge is loaded into the tape drive, the tape is extracted by mechanisms in the drive so that a segment of the tape is pulled from the cartridge and into a tape path that travels proximate the head unit. The extraction mechanisms take the form of tape guides which are mounted on trolleys. During the extraction operation, trolley motors move the trolleys along a predefined trolley path, so that the tape guides which surmount the trolleys displace the tape into the tape path as the trolleys travel along the trolley path. When the trolleys reach the full extent of travel along the trolley path, the tape is proximate the head unit. Thereafter the tape can be transported past the head unit, e.g., by activation of a capstan and/or the supply reel and take-up reel motors, depending upon the particular type of transport mechanisms employed.

Dual reel tape cartridges such as that described above require a relatively large plan area. Consequentially, dual reel tape cartridges are not well-suited to deep, small area form factor shapes (e.g., such as the 5.25 inch full high form factor known in the data storage industry).

There are types of tape cartridges other than dual reel tape cartridges. For example, an IBM 3480-type magnetic tape cartridge is a single reel, tape cartridge that has a leader block attached to one end of the tape. The leader block protrudes from or is otherwise situated so that a tape transport mechanism can grasp the leader block and thread the leader block end of the tape over a path to a take-up reel. The tape path includes a plurality of bearings for guiding the tape. The take-up reel usually includes a slot for receiving the leader block and is connected to an associated drive mechanism which transports the tape between the take-up reel and the tape cartridge.

U.S. Pat. No. 5,128,815 describes various other approaches to tape loading using single reel tape cartridges. In one approach, a leader tape is used in lieu of a leader block. According to U.S. Pat. No. 5,128,815, the leader tape follows a complex tape threading path around associated heads to the take-up reel. As the leader tape traverses the entirety of this complex tape threading path, the narrower magnetic tape is also pulled through the tape threading path and physically wrapped around a rotary head.

An alternative helical scan data storage arrangement described as prior art in U.S. Pat. No. 5,128,815 utilizes a two reel cassette having its reels placed coaxially, one over the other, necessitating an angled tape path within the tape cassette between the two reels to transport the tape between the two reels.

U.S. Pat. No. 5,128,815 itself concerns an IBM-3480-type single reel tape cartridge that is handled in such a way to create a "virtual" dual reel tape cassette. The tape handling involves a two step process. In the first step, a tape end (e.g., leader block) is withdrawn from the single reel tape cartridge and moved to be attached to the take-up reel (thereby effectively forming a dual reel tape cartridge). In the second step, other tape guiding elements withdraw the tape further from the virtual tape cassette, bringing the tape into contact with the helical scanner in a manner similar to other self-threading helical drives using conventional dual reel cartridges. Yet the virtual dual reel tape cassette still requires a relatively large plan area, as the second tape reel (i.e., the take-up reel), although not part of the tape cartridge, is coplanar with the single reel (i.e., the supply reel) of the IBM-3480-type cartridge.

U.S. Pat. No. 5,303,809 and U.S. Pat. No. 5,374,003 show variations of tape threading for a virtual tape cassette. Some of the variations in U.S. Pat. No. 5,374,003 involve use of an elevator to raise or lower the coplanar arrangement of the single reel of the cartridge and the take-up reel to another plane at which the threading path is located. However, all variations have the single reel of the IBM-3480-type cartridge and the take-up reel as being coplanar at all times. Hence, these variations consistently require the relatively large plan area, as discussed above.

What is needed, therefore, and an object of the present invention, is a tape drive that accommodates a single reel tape cartridge within a small area form factor shape.

BRIEF SUMMARY OF THE DISCLOSURE

A helical scan tape drive has a cartridge compartment for accommodating a single reel cartridge of magnetic tape, and a take-up reel which, with respect to a threading path, is not coplanar with the cartridge compartment. A threading system grasps an end of the magnetic tape in the cartridge and transports the magnetic tape through the threading path. The threading path is configured such that the magnetic tape is at least partially wrapped around a rotatable scanner before the end of the magnetic tape is attached to the take-up reel. The rotatable scanner has one or more elements for transducing information relative to the magnetic tape.

The take-up reel is situated at a location either above or below the cartridge compartment for reducing footprint of the drive. In one embodiment, the take-up reel and the cartridge compartment are in an at least partially overlapping relationship, e.g., with respect to a planar extension of at least one side wall of the cartridge compartment. The magnetic tape in the single reel cartridge (accommodated in the cartridge compartment) travels in a single reel plane when the magnetic tape is wound or unwound in the single reel cartridge; the magnetic tape on the tape-up reel travels in a take-up reel plane when the magnetic tape is wound or unwound relative to the take-up reel. In an illustrative embodiment, the single reel plane and the take-up reel plane are skew planes. A single reel plane intersection is formed by an intersection of the single reel plane with a plane perpendicular to a bottom wall of a cabinet, while a take-up reel plane intersection is formed by an intersection of the take-up reel with the plane perpendicular to a bottom wall of a cabinet. The single reel plane intersection and the take-up reel plane intersection are preferably angularly inclined relative to one another at an acute angle.

The threading system comprises a threading guide and a threading carriage. The threading guide grasps an end of the magnetic tape in the cartridge and carries it along the threading guide, thereby withdrawing the tape from the cartridge. Preferably the threading guide forms a non-planar threading path. In an illustrated example embodiment, the threading carriage is suspended below the threading guide. In such embodiment, the threading guide has a first end proximate the cartridge compartment and a second end proximate the take-up reel. The first end of the threading guide is essentially parallel to the single reel plane; the second end of the threading guide is essentially parallel to the take-up reel plane.

Plural guide elements contact the tape as the threading system transports the magnetic tape through the threading path. The plural guide elements include at least one stationary guide element and at least one movable guide element. After the magnetic tape is attached to the take-up reel, at least one moveable guide element is actuated to increase a degree of wrap of the magnetic tape about one or more of the stationary guide elements.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
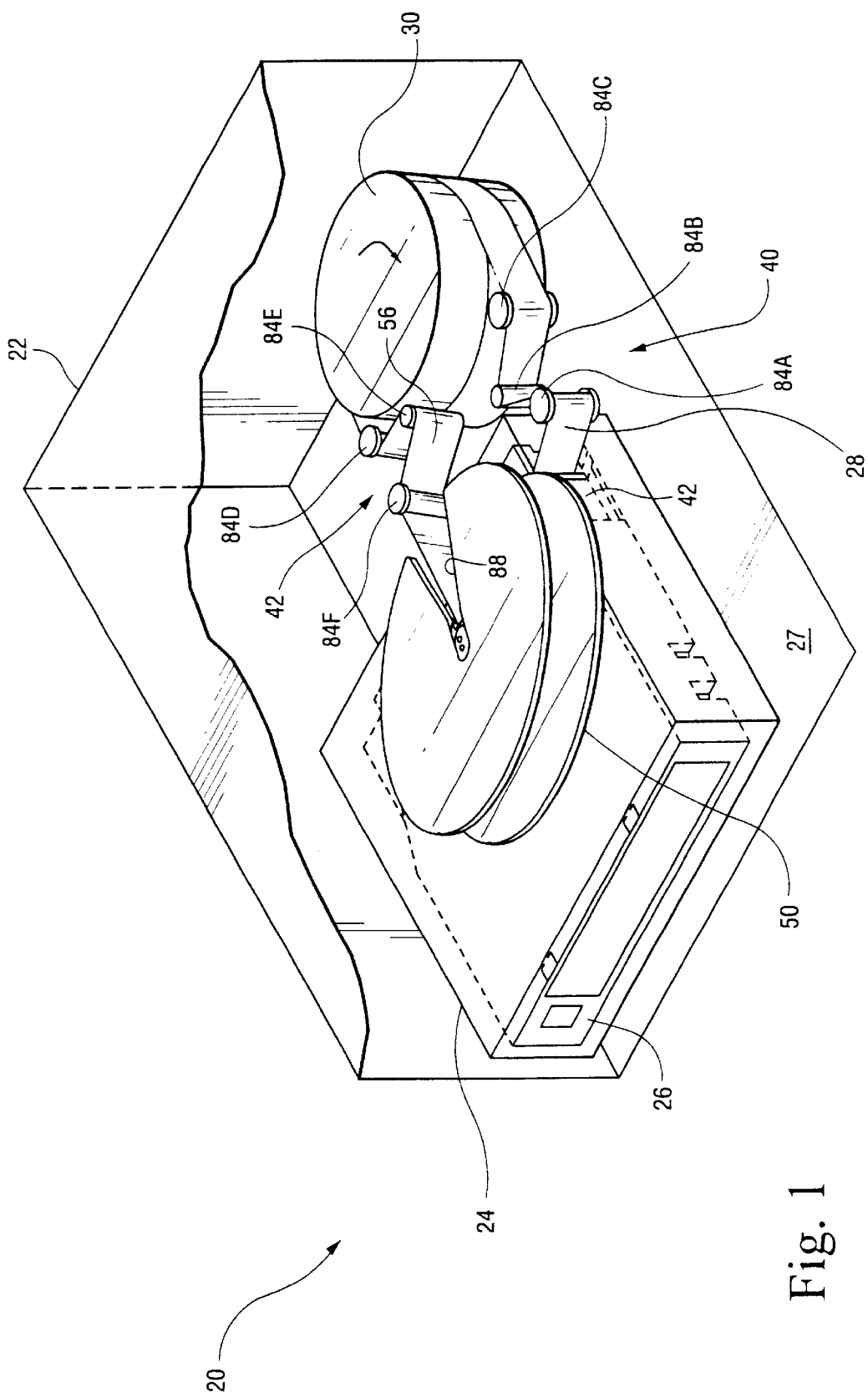
FIG. 1 is an right front isometric view of an example embodiment of a helical scan tape drive with a portion of a drive cabinet removed.

FIG. 1 shows an example embodiment of a helical scan tape drive 20. For sake of illustration only, the tape drive 20 is shown as having essentially rectangular cabinet 22 in which components of the tape drive 20 are housed. Neither the shape nor external details of cabinet 22 are critical, as tape drive 20 may acquire any of several different shapes and/or contours. In FIG. 1, the top, front, and right side walls of the cabinet 22 are removed to facilitate convenient viewing of certain hardware components of tape drive 20.

A cartridge compartment 24 is situated proximate a front wall of cabinet 22. The cartridge compartment 24 has an interior cavity which accommodates a single-reel tape cartridge 26 of magnetic tape 28. In the particular embodiment shown in FIG. 1, the cartridge compartment 24 lies near and preferably parallel to a bottom wall 27 of cabinet 22. The cartridge compartment 24 is preferably situated so that a mouth of its interior cavity is oriented substantially flush or proximate to a front wall of cabinet 22 in order to permit the single-reel tape cartridge 26 to be inserted through an aperture or bezel in the front wall of cabinet 22 and then received into the interior cavity of the cartridge compartment 24, or to permit the single-reel tape cartridge 26 to be discharged from the interior cavity of cartridge compartment 24 through the aperture or bezel in the front wall of cabinet 22.

Examples of single-reel tape cartridges suitable for use in tape drive 20 are 3480-like or LTO-like magnetic tape cartridges. In such cartridges, with reference to its elongated or major dimension the magnetic tape has a fixed end which is secured to the single reel of the single-reel tape cartridge, and a displaceable end in the form of a leader, pin or the like which is employed to extract the tape from the single-reel tape cartridge. The magnetic tape 28 has a width (depicted by the direction of arrow 29 in FIG. 2A and FIG. 2B) which is orthogonal to a major dimension of magnetic tape 28, i.e., orthogonal to the direction of travel of magnetic tape 28. It should be understood that the present invention is not confined to any particular type of single-reel tape cartridge, nor any particular recording media in such cartridge.

The tape drive 20 also has a rotatable scanner or drum 30 which carries, essentially on its periphery, one or more elements (e.g., heads) for transducing information relative to the magnetic tape in a helical stripe pattern. The number and precise positions of the transducing elements can vary, although in an example embodiment herein described (see, e.g., FIG. 6) eight heads (four read heads and four write heads) are shown for sake of illustration.

In tape drive 20, a threading system 40 grasps an end of the magnetic tape in the cartridge and transports the magnetic tape through a threading path 42. The threading path 42, described in more detail subsequently, extends from a cartridge tape door 44 (from which a displaceable end pin of the magnetic tape either or protrudes or otherwise is obtainable) to a take-up reel 50.

By virtue of the fact that cartridge compartment 24 has a cavity sized to accommodate single-reel tape cartridge 26, and in view of the fixed location of single reel 52 of cartridge compartment 24 within single-reel tape cartridge 26, cartridge compartment 24 defines a single reel position for single reel 52 of cartridge compartment 24. Unlike many helical scan tape drives, the take-up reel 50 is not coplanar with the single reel position defined by cartridge compartment 24. Rather, as illustrated in FIG. 2A and FIG. 2B, a plane of the take-up reel 50 and a single reel plane defined by cartridge compartment 24 are inclined relative to one another at an acute angle.

Figure 2A:
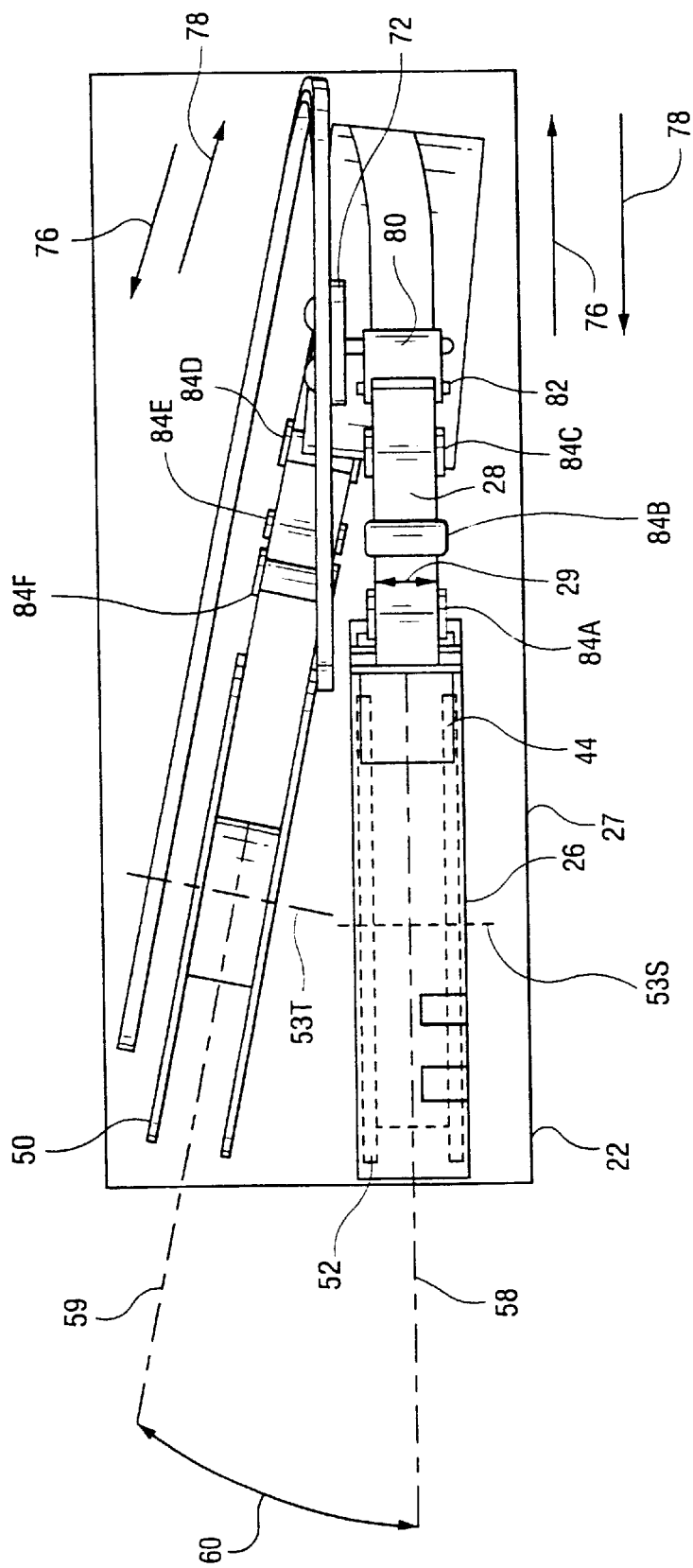
FIG. 2A is a right side view of the helical scan tape drive of the example embodiment of FIG. 1, with magnetic tape having been withdrawn from a single-reel tape cartridge to an intermediate position on a threading path.
Figure 2B:
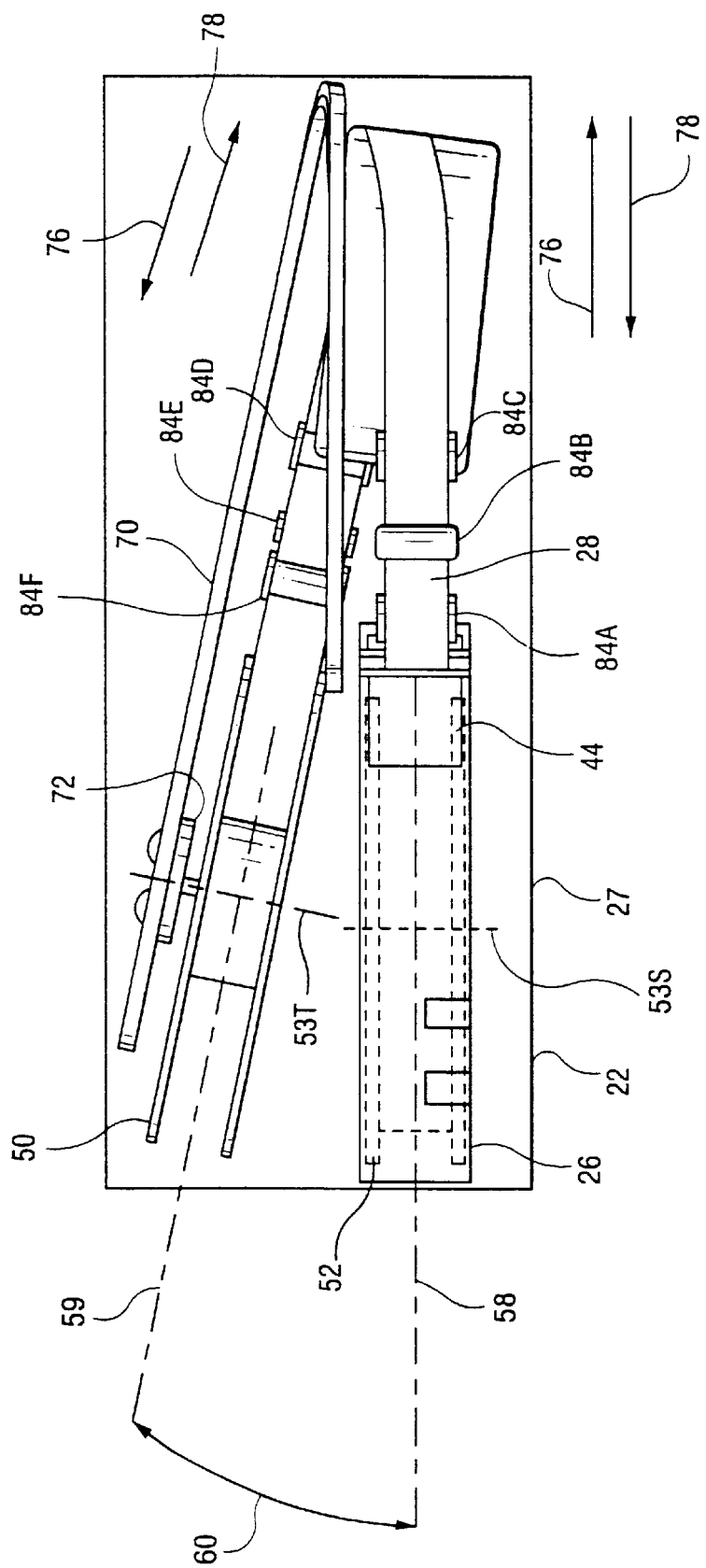
FIG. 2B is a right side view of the helical scan tape drive of the example embodiment of FIG. 1, with magnetic tape having been withdrawn from a single-reel tape cartridge to a final position on a threading path.
Figure 4:
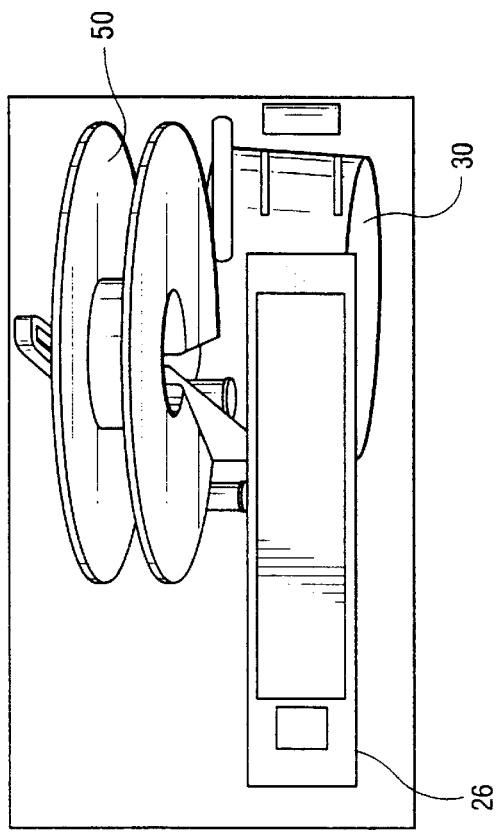
FIG. 4 is a front view of the helical scan tape drive of the example embodiment of FIG. 1.

In the above regard, a dot-dashed line 58 in FIG. 2A and FIG. 2B represents a single reel plane. The single reel plane 58 lies orthogonally to the width of magnetic tape 28 (the width being depicted by arrow 29) contained in the single reel cartridge 26. A take-up reel plane (indicated by dot-dashed line 59 in FIG. 2A and FIG. 2B) lies orthogonally to the width of magnetic tape 28 as wound about take-up reel 50.

The single reel plane 58 and the take up reel plane 59 are non-coincident planes (not coplanar). Moreover, in the illustrated example embodiment, the single reel plane 58 and the take up reel plane 59 are not parallel to one another, and in this sense are considered as "skew" planes. Further, in some example embodiments such as that illustrated the single reel plane 58 and the take up reel plane 59 are not necessarily both perpendicular to the plane of the sheet of FIG. 2A and FIG. 2B, as one or both of single reel plane 58 and take up reel plane 59 can be non-orthogonal relative to the sheet, and thus skew to one another. In the illustrated embodiment (in which such skewness is very slight), a single reel plane intersection is formed by an intersection of the single reel plane with a plane perpendicular to a bottom wall of a cabinet, while a take-up reel plane intersection is formed by an intersection of the take-up reel with the plane perpendicular to a bottom wall of a cabinet. The single reel plane intersection and the take-up reel plane intersection are preferably angularly inclined relative to one another at an acute angle 60. Preferably angle 60 is in a range of from about 5 degrees to 30 degrees, and most preferably is about 15 degrees plus or minus 5 degrees.

Moreover, the take-up reel 50 and the cartridge compartment 24 (which accommodates single-reel tape cartridge 26 with its reel 52) are situated preferably (but not necessarily) in an at least partially overlapping relationship. That is, if all sidewalls of cartridge compartment 24 were extended infinitely in a direction parallel to a rotational axis 53S of reel 52 (e.g., in a direction perpendicular to a bottom wall of cabinet 22), at least a portion of at least one side wall would intersect take-up reel 50 (see FIG. 3).

A rotational axis 53T of the tape-up reel 50 is skew to rotational axis 53S of reel 52 of the single reel cartridge (see FIG. 2A). In some embodiments, rotational axis 53T of the tape-up reel 50 and rotational axis 53S of reel 52 may intersect, but such is not required for all embodiments.

While the embodiment shown in FIG. 1, FIG. 2A, and FIG. 2B shows that the take-up reel 50 is situated above the cartridge compartment 24, it should be understood that the order of surmounting may be reversed. That is, the take-up reel 50 can instead be situated below the cartridge compartment 24. Thus, take-up reel 50 can be situated at a location either above or below the cartridge compartment 24 for reducing the footprint of the drive.

The threading system 40 comprises a threading guide 70 and a threading carriage 72. The threading guide defines the threading path 42, which preferably is a non-planar threading path as illustrated in FIG. 2A and FIG. 2B. In the illustrated embodiment, the threading guide 70 has a first end proximate the cartridge compartment 24 and a second end proximate the take-up reel 50. The first end of the threading guide 70 is essentially parallel to the single reel plane 58; the second end of the threading guide 70 is essentially parallel to the take-up reel plane 59.

Figure 3:
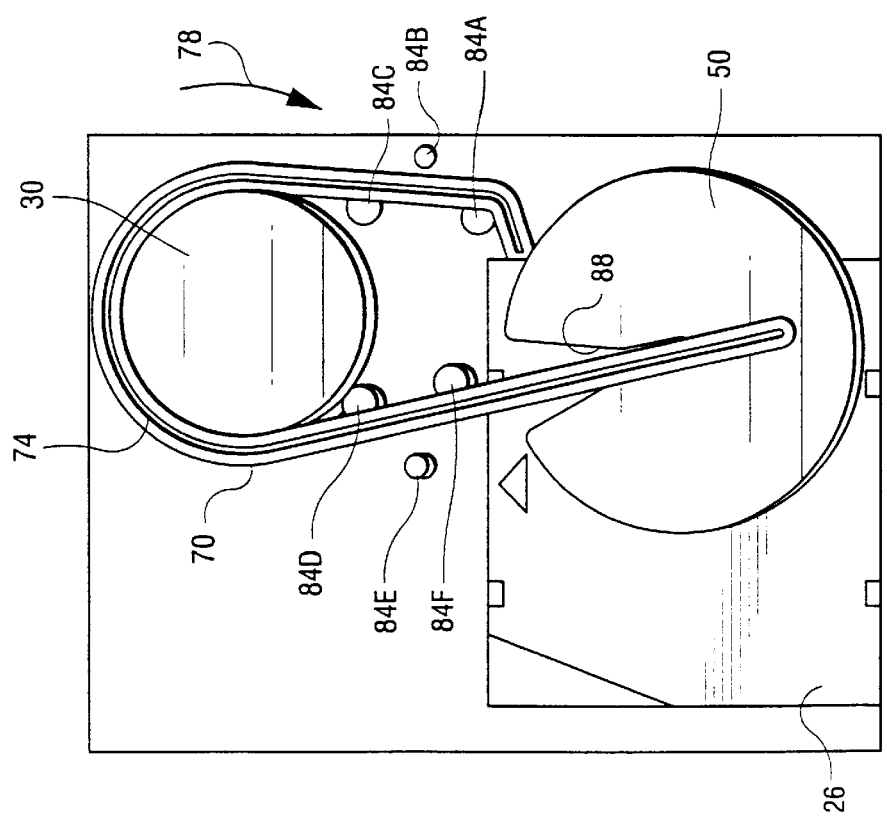
FIG. 3 is a top view of the helical scan tape drive of the example embodiment of FIG. 1.

The threading guide 70 can be mounted within the tape drive 20, e.g., to a frame or chassis of the tape drive 20. As shown in FIG. 3, threading guide 70 has a central slotted track 74 along its length. The threading carriage 72 travels along the slotted track 74, either away from the cartridge compartment 24 in a tape withdrawal operation (in the direction of arrow 76), or toward cartridge compartment 24 in a tape rewind operation (in the direction of arrow 78). In the particular embodiment shown in FIG. 2A, FIG. 2B, FIG. 3, and FIG. 4, the threading guide 70 is situated above threading carriage 72, with the threading carriage 72 depending from the threading guide 70. At its distal end, the threading carriage 72 has a threading hook 80 which engages a tape end pin 82 of magnetic tape 28 (see, e.g., FIG. 2A).

Displacement of the threading carriage 72 along threading guide 70 can be accomplished in any of several ways. For example, slotted track 74 of threading guide 70 may have a transmission chain which is engaged by a top end of threading carriage 72 and displaced either in the direction of arrow 76 or arrow 78 depending on the desired direction and operation. Alternatively, threading carriage 72 may have a stepper motor-actuated gear which engages and travels along a rack and pinion type interior of slotted track 74 of threading guide 70.

The illustrated configuration of threading system 40 is just one example implementation. Other configurations are entirely suitable, such as a configuration wherein the threading carriage travels above a threading guide.

The threading system 40 also has plural guide elements 84 which contact the tape either as the threading system transports the magnetic tape 28 through the threading path 42 or upon conclusion of the threading. In the illustrated embodiment, six such guide elements 84A–84F are provided (see, e.g., FIG. 1 and FIG. 3). The guide elements 84 may be implemented, e.g., using rollers.

The guide elements 84A–84F comprise a set of stationary guide elements (84A, 84C, 84D, and 84F) and a set of moveable guide elements (84B, 84E). As shown in FIG. 3, the stationary guide elements 84A and 84C are situated between cartridge compartment 24 and rotatable scanner 30, and are positioned along threading path 42 so that magnetic tape 28 being extracted or withdrawn from cartridge compartment 24 travels counterclockwise around a right periphery of guide elements 84A and 84C from the perspective of the top of tape drive 20. In essentially mirror image fashion with respect to guide elements 84A and 84C along an imaginary line connecting take-up reel 50 and rotatable scanner 30, the stationary guide elements 84D and 84F are situated between rotatable scanner 30 and 50 (and have their left periphery contacted by counterclockwise traveling withdrawing magnetic tape 28). Thus, guide elements 84A, 84C, 84D, and 84F are essentially located interior to a boundary defined by threading guide 70 as seen from above (see FIG. 3).

The guide elements 84B and 84E are moveable guide elements which have respective un-actuated positions as shown in FIG. 3. In particular, the un-actuated position of guide element 84B is between guide elements 84A and 84C along threading path 42, but on an opposite side (as seen from above) of threading guide 70 from guide elements 84A and 84C (e.g., on the outside of threading guide 70). Similarly, the un-actuated position of guide element 84E is between guide elements 84D and 84F along threading path 42, but on an opposite side (as seen from above) of threading guide 70 from guide elements 84D and 84F (e.g., on the outside of threading guide 70).

The take-up reel 50 has a wedge-shaped notch 88 into which the threading hook 80 of threading carriage 72, traveling along threading guide 70, delivers the end pin 82 upon reaching the farthest extent of the tape withdrawal action. After the end pin 82 of magnetic tape is secured within notch 88 of take-up reel 50, in the manner hereinafter described the moveable guide elements 84B and 84E are actuated to increase a degree of wrap of the magnetic tape 28 about the stationary guide elements (84A, 84C, 84D, and 84F), and about themselves. That is, the moveable guide elements 84B and 84E are moved in the direction depicted by dotted lines 89 in FIG. 5D, resulting in the positioning of guide elements 84B and 84E shown in FIG. 1.

Figure 5B:
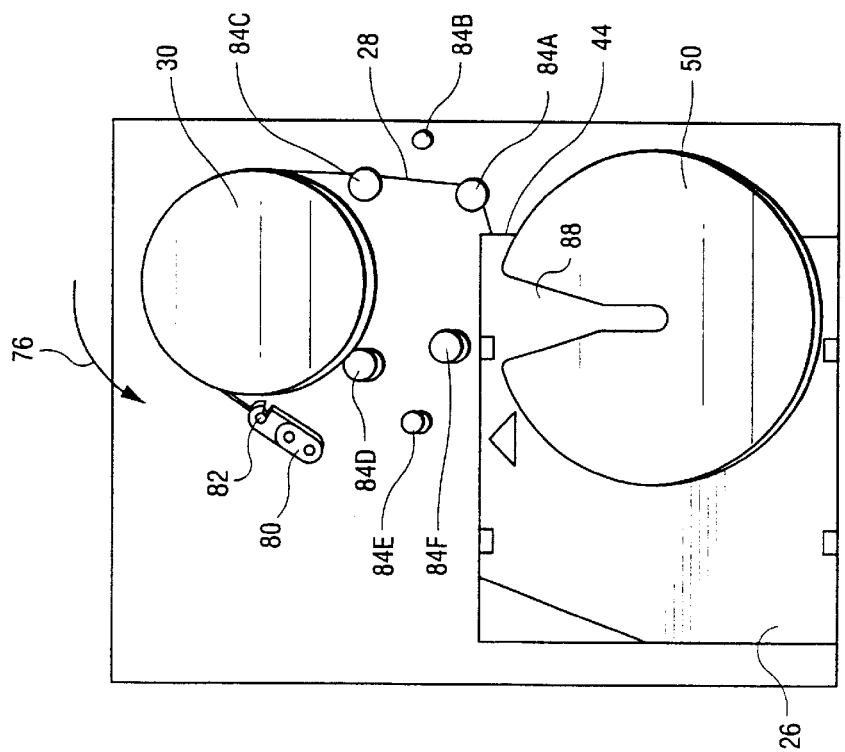
FIG. 5A–FIG. 5D are top views of portions of the helical scan tape drive of the example embodiment of FIG. 1, showing a sequence of steps in a tape withdrawing operation.
Figure 5A:
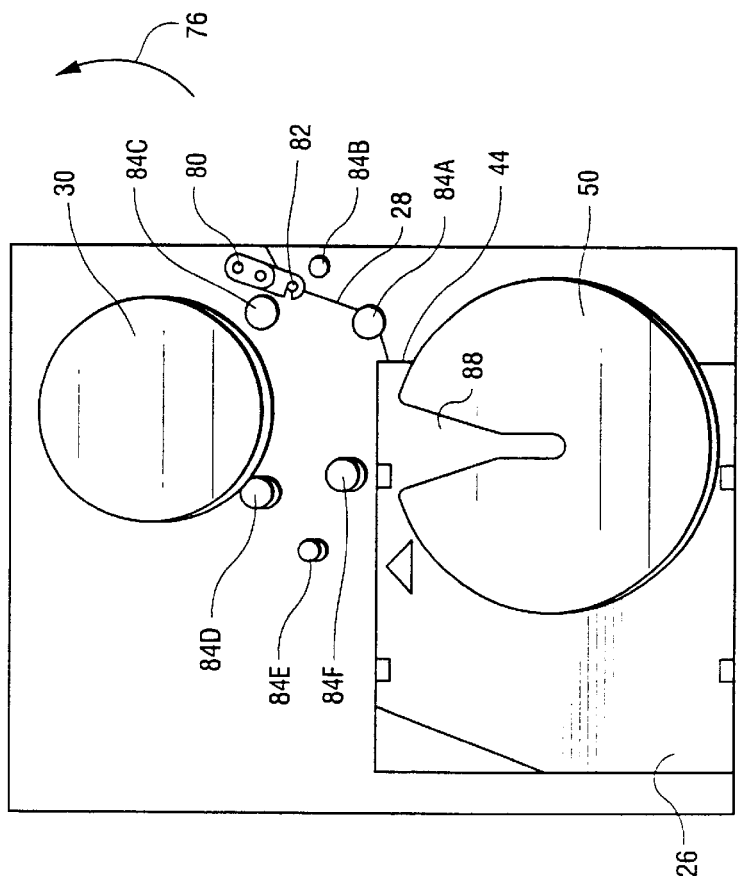

FIG. 5A–FIG. 5D are top views of portions of the helical scan tape drive of the example embodiment of FIG. 1, showing a sequence of steps in a tape withdrawing operation. FIG. 5A shows a step of extracting an end of magnetic tape 28 from a single reel cartridge 52 of the single reel cartridge 26 situated in cartridge compartment 24 of drive 20. FIG. 2A also depicts the situation upon completion of the step of FIG. 5A. In particular, in the step of FIG. 5A threading hook 80 of threading carriage 72 engages end pin 82 of magnetic tape 28 and extracts magnetic tape 28 from cartridge tape door 44 and into threading path 42 in the direction shown by arrow 76. The threading carriage 72 leads the magnetic tape 28 around the first guide element 84A and toward the guide element 84C. The guide element 84B remains in its un-actuated position, i.e., not in contact with magnetic tape 28.

FIG. 5B shows that the threading hook 80 of threading carriage 72, following threading guide 70, directs magnetic tape 28 around the guide element 84C and partially around rotatable scanner 30. Thus, the threading guide 70 at least partially wraps the magnetic tape 28 around the scanner 30 before attaching the end of the magnetic tape 28 to the take-up reel 50.

Figure 5D:
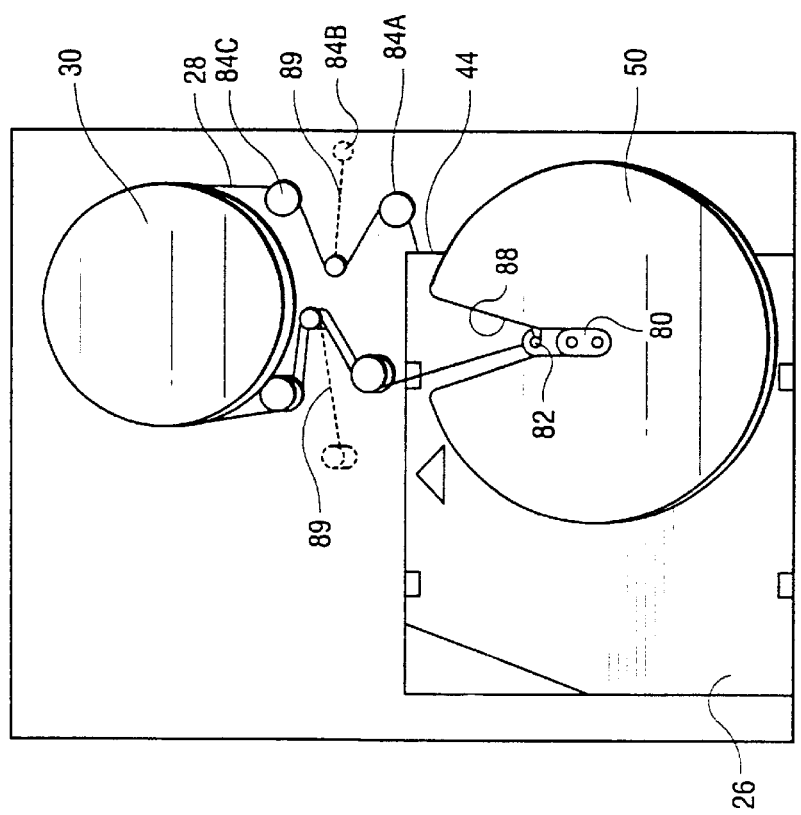
Figure 5C:
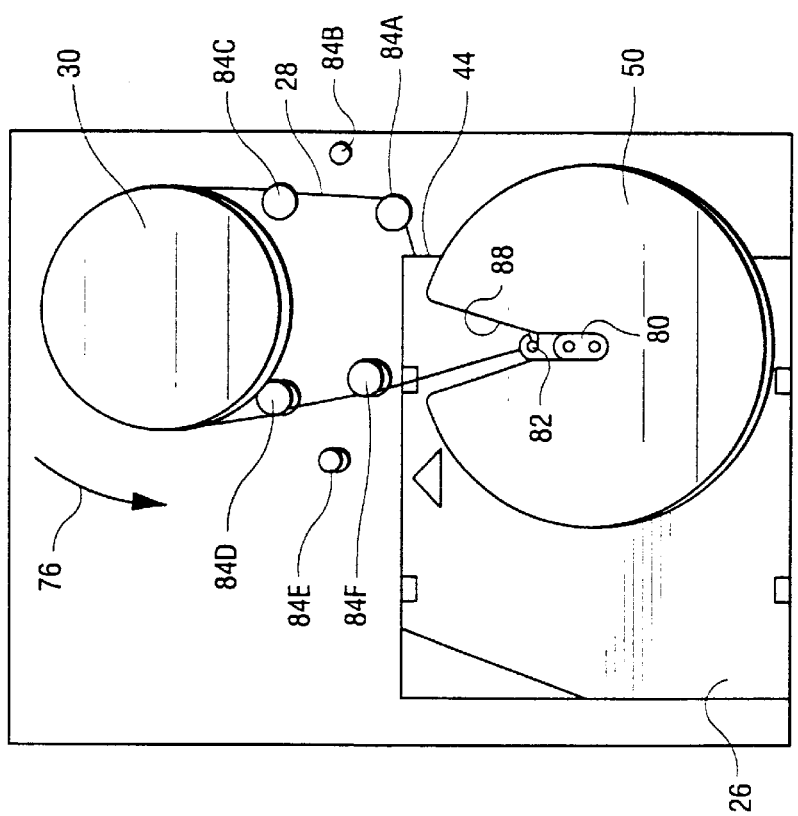

Subsequently, as shown in FIG. 5C, the threading hook 80 of threading carriage 72 carries magnetic tape 28 first essentially tangentially around a left periphery of guide element 84D, then essentially tangentially around a left periphery of guide element 84F, and then docks the end pin 82 of magnetic tape 28 in notch 88 of take-up reel 50. FIG. 2B shows the final position of the threading carriage 72 corresponding to completion of the steps shown in FIG. 5C.

FIG. 5D shows a step of displacing the moveable guide elements 84B and 84D into contact with magnetic tape 28 such that appropriate tape wrap angles are established for each of guide elements 84a–84F. In particular, the appropriate degree of wrap is accomplished by displacing the moveable guide elements 84B and 84D further into contact with the magnetic tape, e.g., from the un-actuated positions to the actuated positions. Such displacement of the moveable guide elements 84B and 84D occurs in the direction of arrow 89 shown in FIG. 5D.

As is understood from the foregoing, the unwinding of the magnetic tape 28 from the single reel cartridge 24 causes the magnetic tape 28 first to travel in the single reel plane 58, and then around the rotatable scanner 30. Upon winding the magnetic tape 28 on the tape-up reel 50, the magnetic tape 28 travels in the take-up reel plane 59 (see FIG. 2B). As explained previously, intersections of the single reel plane 58 and the take-up reel plane 59 are inclined relative to one another at the acute angle 60.

Whereas FIG. 5A–FIG. 5D show steps of the tape extraction operation (in which the magnetic tape 28 travels in the direction of arrow 76), it will be understood that in the rewinding of the magnetic tape 28 toward cartridge compartment 24 (with the magnetic tape 28 travelling in the direction of arrow 78), the steps depicted in FIG. 5A–FIG. 5D are performed in an essentially reverse order.

Figure 6:
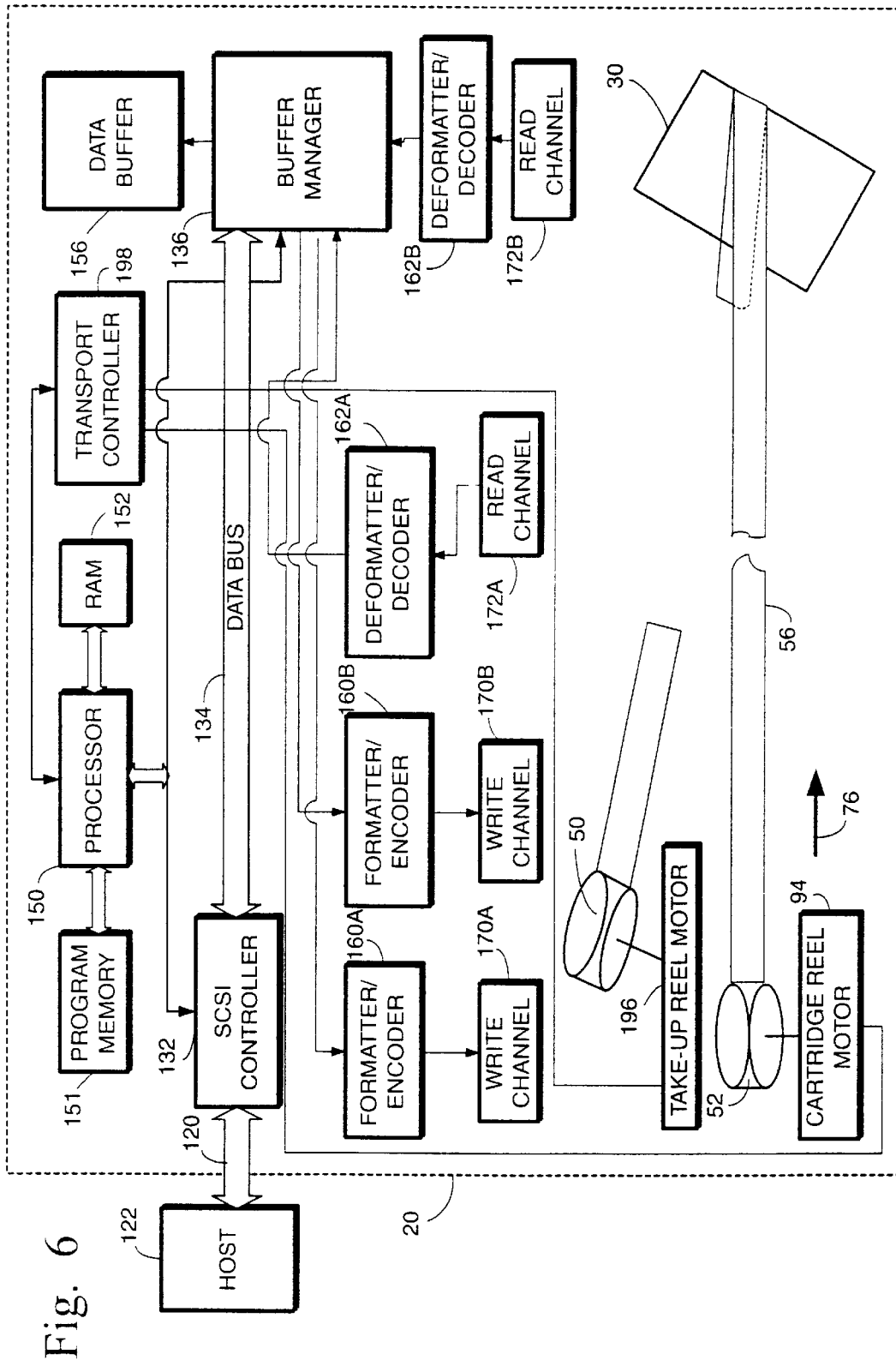
FIG. 6 is a schematic view of the example embodiment of FIG. 1 including various electronic components thereof.

FIG. 6 shows a context of operation and other aspects of an example, illustrative embodiment of tape drive 20. In FIG. 6, the tape drive 20 is connected by a SCSI bus 120 to a host computer 122. The tape drive 20 includes a SCSI controller 132 which is connected to SCSI bus 120. Data bus 134 connects SCSI controller 132 to buffer manager 136. Both SCSI controller 132 and buffer manager are connected by a bus system 140 to processor 150. Processor 150 is also connected to program memory 151 and to a data memory, particularly RAM 152.

Buffer manager 136 controls, e.g., both storage of user data in buffer memory 156 and retrieval of user data from buffer memory 156. User data is data obtained from host 122 for recording on tape 28, or data reproduced from tape 28 and destined to host 122. Buffer manager 136 is also connected to one or more formatter(s)/encoder(s) 160 and to one or more deformatter(s)/decoder(s) 162. In the particular illustrated example embodiment, two formatter/encoders 160A and 160B and deformatter/decoders 162A and 162B are provided. Formatter/encoders 160 and deformatter/decoders 162 are, in turn, respectively connected to write channels 170 and read channels 172. In particular, formatter/encoder 160A and formatter/encoder 160B are respectively connected to write channel 170A and write channel 170B, respectively, while deformatter/decoder 162A and deformatter/decoder 162B are connected to read channel 172A and read channel 172B, respectively.

Figure 7:
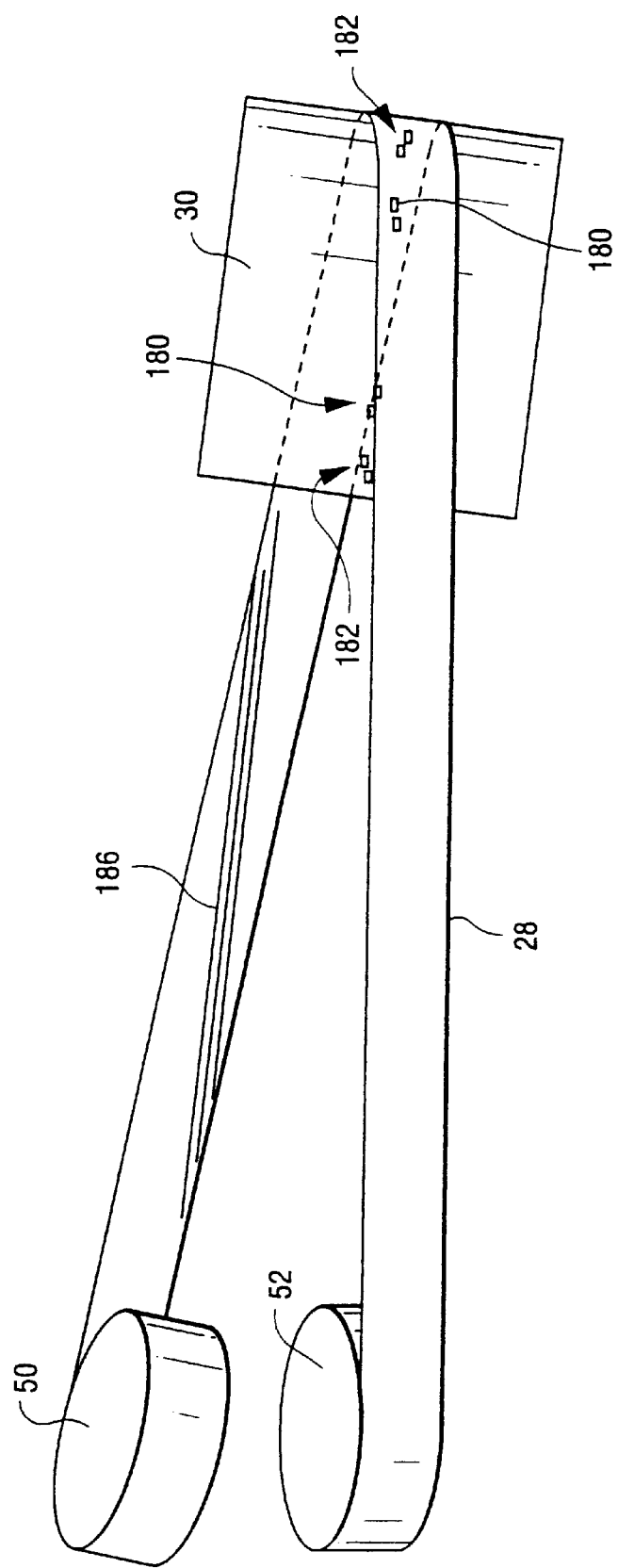
FIG. 7 is a diagrammatic view showing wrapping of tape around a scanner in accordance with the example embodiment of FIG. 1.

Although not explicitly shown as such in FIG. 6 in order not to obscure other facets of tape drive 20, each write channel 170 is connected to one or more recording element(s) or write head(s) 180; each read channel is connected to one or more read element(s) or read head(s) 182. The write head(s) 180 and the read head(s) 182 are mounted in pairs on the rotatable scanner 30. In the illustrated embodiment, each of the channels 170A, 170B, 172A, and 172B are connected to two heads, the connection between the two heads being switched with respect to each channel in accordance with rotational position of scanner 30. Being only illustrative and not to scale, FIG. 6 shows only generally the wrapping of tape 28 around scanner 30. The tape path around scanner 30 is essentially identical in form to that of prior art helical scan drives, so that the positions of heads 180, 182 on rotatable scanner 30 do not differ from prior art drives. An example placement of heads 180, 182 on rotatable scanner 30, and the wrapping of tape 28 around rotatable scanner 30, is shown in FIG. 7. The heads on the left side of the rotatable scanner 30 in FIG. 7 do not appear to be within the boundary of the tape edges, since at these points the heads are at a position during the revolution of rotatable scanner 30 that these heads are not in contact with tape 28.

Those skilled in the art will appreciate that each write channel 170 includes various circuits and elements including a RLL modulator, a parallel-to-serial converter, and write current modulator. Similarly, the person skilled in the art understands that each read channel 172 includes a data pattern and clock recovery circuit, a serial-to-parallel converter, and, an RLL demodulator. These and other aspects of tape drive 20, including serving, error correction, are not necessary for an understanding of the invention and accordingly are not specifically described herein.

In one example embodiment, four write heads 180 and four read heads 182 are mounted on rotatable scanner 30, with each channel being switchably connected to two heads. The present invention is not limited by such factors as, for example, the number of heads employed. Tape 28 is wrapped around scanner 30 such that head(s) 180 and 182 follow helical stripes 186 on tape 28 as tape 28 is transported in a direction indicated by arrow 76 from a supply reel 52 to a take-up reel 50. As understood from the foregoing description of, e.g., FIG. 1, supply reel 52 is housed in the single-reel tape cartridge 26 (which is inserted in cartridge compartment 24) from which tape 28 is extracted into tape path 42 in the aforedescribed manner.

In addition to write heads 180 and read heads 182, scanner 30 can also have certain electronics mounted thereon. The scanner-mounted electronics can include write drivers as well as read preamplifiers.

One or both of single reel 52 and take-up reel 50 are driven by a reel motor. Only one reel motor may be utilized when a capstan is employed for tape transport. In the illustrated embodiment, single reel 52 and take-up reel 50 are driven by respective reel motors 194 and 196 for transporting tape 28 in the threading path 42. Reel motors 194 and 196 are driven by transport controller 198, which ultimately is governed by processor 150. One manner of operation and control of the tape transport mechanism of a tape drive including reel motors 194 and 196 is understood by the person skilled in the art with reference, for example, to U.S. Pat. No. 5,680,269 and incorporated herein by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A helical scan tape drive comprising:
   a cartridge compartment for accommodating a single reel cartridge of magnetic tape;
   a take-up reel;
   a rotatable scanner having an element for transducing information relative to the magnetic tape;
   a threading system which grasps an end of the magnetic tape in the cartridge and which transports the magnetic tape trough a threading path whereby the magnetic tape is at least partially wrapped around the scanner before attaching the end of the magnetic tape to the take-up reel;
   wherein the magnetic tape in the single reel cartridge travels in a single reel plane when the magnetic tape is wound or unwound in the single reel cartridge, wherein the magnetic tape on the tape-up reel travels in a take-up reel plane when the magnetic tape is wound or unwound relative to the take-up reel; and wherein the single reel plane and the take-up reel plane are non-parallel planes.

2. The apparatus of claim 1, wherein the tape drive has a bottom wall, wherein a single reel plane intersection is formed by an intersection of the single reel plane with a plane perpendicular to the bottom wall of a cabinet, wherein a take-up reel plane intersection is formed by an intersection of the take-up reel with the plane perpendicular to the bottom wall of a cabinet, and wherein the single reel plane intersection and the take-up reel plane intersection are preferably angularly inclined relative to one another at an acute angle.

3. The apparatus of claim 2, wherein the acute angle is preferably in a range of from about 5 degrees to 30 degrees, and most preferably is about 15 degrees plus or minus 5 degrees.

4. The apparatus of claim 1, wherein the tape drive has a bottom wall, wherein a single reel plane intersection is formed by an intersection of the single reel plane with a plane perpendicular to the bottom wall of a cabinet, wherein a take-up reel plane intersection is formed by an intersection of the take-up reel with the plane perpendicular to the bottom wall of a cabinet, and wherein the single reel plane intersection and the take-up reel plane intersection are preferably angularly inclined relative to one another at an acute angle.

5. The apparatus of claim 4, wherein the acute angle is preferably in a range of from about 5 degrees to 30 degrees, and most preferably is about 15 degrees plus or minus 5 degrees.

6. The apparatus of claim 1, wherein the take-up reel is situated at a location either above or below the cartridge compartment for reducing a footprint of the drive.

7. The apparatus of claim 6, wherein the take-up reel and the cartridge compartment are in an at last partially overlapping relationship.

8. The apparatus of claim 6, wherein the take-up reel and the cartridge compartment are in an at last partially overlapping relationship with respect to a planar extension of at least one side wall of the cartridge compartment.

9. The apparatus of claim 1, further comprising plural guide elements which the tape contacts as the threading system transports the magnetic tape through the threading path.

10. The apparatus of claim 9, wherein the plural guide elements comprise at least one stationary guide element and at least one moveable guide element, and wherein the moveable guide element is actuated to increase a degree of wrap of the magnetic tape about the at least one stationary guide element.

11. The apparatus of claim 1, wherein the threading system comprises a threading guide and a threading carriage, wherein the threading guide grasps the end of the magnetic tape in the cartridge and travels along the threading guide.

12. The apparatus of claim 11, wherein the threading carriage is suspended below the threading guide.

13. Thee apparatus of claim 11, wherein the threading guide forms a non-planar threading path.

14. The apparatus of claim 1, further a data buffer memory;

a buffer manager for controlling write and read operations relative to the data buffer memory; and a write channel connecting the data buffer memory to the write element and a read channel connecting the data buffer memory to the read element.

15. The apparatus of claim 14, wherein the take-up reel is situated at a location either above or below the cartridge compartment for reducing a footprint of the drive.

16. For use in a helical scan tape drive which employs a rotatable scanner having an element for transducing information relative to magnetic tape, a method comprising:

extracting an end of magnetic tape from a single reel cartridge of magnetic tape, the single reel cartridge of magnetic tape being situated in a cartridge compartment of the drive;

transporting the magnetic tape through a non-planar threading path, the transporting including:

at least partially wrapping the magnetic tape around the scanner; and thereafter attaching the end of the magnetic tape to a take-up reel;

unwinding the magnetic tape in the single reel cartridge whereby the tape travels in a single reel plane;

winding the magnetic tape on the tape-up reel whereby the tape travels in a take-up reel plane; and wherein the single reel plane and the take-up reel plane are non-parallel planes.

17. The method of claim 16, wherein at least one stationary guide element and at least one moveable guide element are provided for contacting the magnetic tape in the tape path; and wherein the method further comprises a subsequent step of increasing a degree of wrap of the magnetic tape about the scanner.

18. The method of claim 17, wherein the step of increasing the degree of wrap of the magnetic tape about the scanner is accomplished by displacing the at least one moveable guide element.

* * * * *